Sept. 6, 1960 W. D. CARDWELL 2,951,394
VALVE OPERATING ASSEMBLY
Filed March 2, 1959 6 Sheets-Sheet 1

William D. Cardwell    Inventor

By W.O.T. Heilman

Attorney

William D. Cardwell  Inventor

By W. O. T Heilman
Attorney

Sept. 6, 1960 W. D. CARDWELL 2,951,394
VALVE OPERATING ASSEMBLY
Filed March 2, 1959 6 Sheets-Sheet 3

William D. Cardwell  Inventor
By W. O. T Heilman
Attorney

Sept. 6, 1960  W. D. CARDWELL  2,951,394
VALVE OPERATING ASSEMBLY
Filed March 2, 1959  6 Sheets-Sheet 6

William D. Cardwell  Inventor
By W. O. T Heilman
Attorney

United States Patent Office 2,951,394
Patented Sept. 6, 1960

2,951,394

VALVE OPERATING ASSEMBLY

William D. Cardwell, 1912 W. 40th St., Tulsa, Okla.

Filed Mar. 2, 1959, Ser. No. 796,355

9 Claims. (Cl. 74—504)

The present invention relates to an operating assembly. More particularly, the invention relates to such an assembly providing means whereby an impact force may be applied to produce rotary motion of a valve stem to open or close a valve, especially under adverse conditions. The invention especially relates to a valve operating assembly adapted to permit accommodation to existing valve structures without extensive modification or reconstruction thereof.

In all manufacturing and fluid transport operations, great numbers of valves are employed for controlling flow of liquids, slurries, gases and the like. A large portion of the valves employed are subjected to conditions which make them difficult to operate. For example, infrequent use may cause a valve to freeze or stick. Where such a condition occurs in an emergency drain or pressure relief conduit, hazardous conditions could result. At other times, a conduit rupture might produce excessive losses of materials, should it be impossible to close a shut-off valve quickly. Again, large valves in conduits under high pressure are difficult to open and close, especially in the initial and final stages respectively. Many times, two or more men are required to operate a valve which should be operable by one man.

It is an object of the present invention to provide a valve operating assembly, which when applied to a conventional valve actuating means, such as a valve stem or valve wheel, will permit operation of the valve under the most adverse conditions of use. It is a further object of the invention to provide such a valve operating assembly, which may be applied to a conventional valve stem either as a replacement for the valve wheel supplied as standard equipment, or as an adjunct thereto. In addition, it is an object of the present invention to provide a valve operating assembly conveniently adaptable for employment in conjunction with any valve which is either lifted from or turned in its seat by means of a valve stem extending outwardly through the valve body, including plug valves, gate valves, etc.

The invention and its objects may be more fully understood from the following description when it is read in conjunction with the accompanying drawings, wherein.

Figure 1:
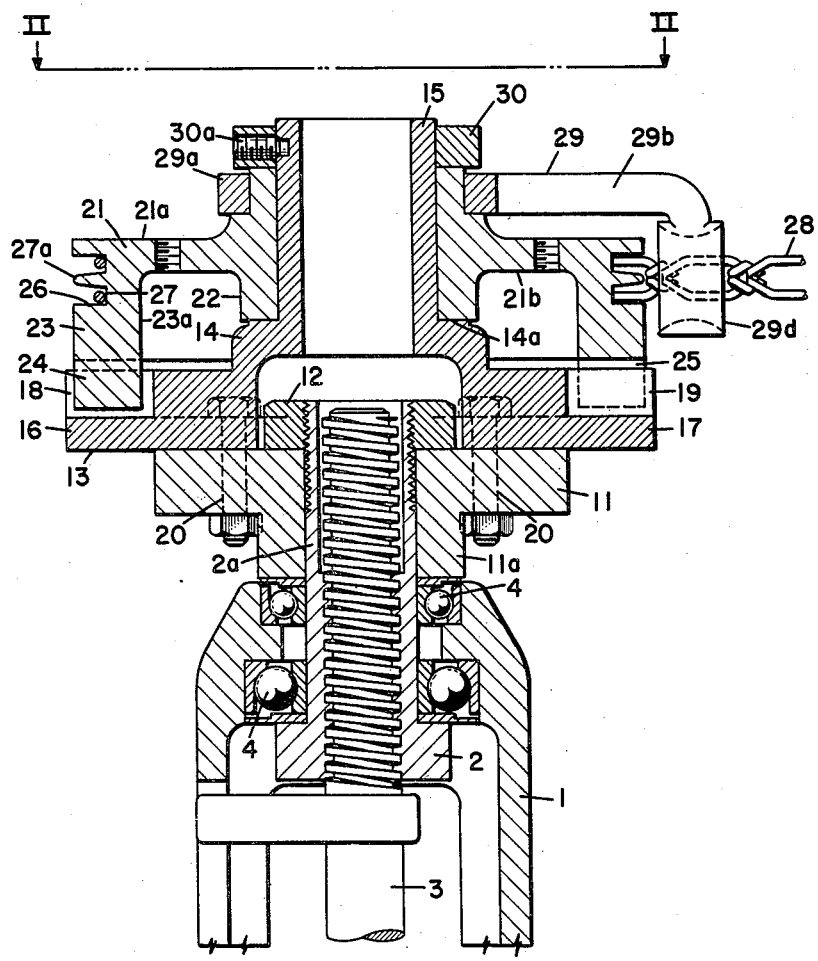
Fig. 1 is a view in section taken longitudinally of a portion of a typical valve stem and of a valve bonnet retainer means therefor, and showing one form of a valve operating assembly, such as contemplated by the present invention, applied to the stem and bonnet.

Referring now to the drawings with greater particularity, wherein like parts are designated by the same numerals, the numeral 1 designates the yoke of a valve bonnet. As shown, the yoke 1 serves as a retainer for an internally threaded sleeve 2 adapted for threaded engagement with a valve stem 3. The sleeve 2 is retained by the yoke 1 for rotation therein through the medium of means such as ball thrust bearings 4, and has an end portion 2a extending beyond the yoke.

In the conventional valve structure, a hand wheel, or other rotatable means for applying leverage as required to actuate the valve stem, is rigidly affixed to the sleeve end portion 2a. The valve structure thus shown and described in part is characterized as a "rising stem" type. As the valve wheel is turned, the sleeve 2 also is turned and interaction of the sleeve and stem threads moves the valve stem axially of the sleeve and yoke, either to open or close the valve. The assembly according to the present invention is intended either to replace the conventional valve wheel as shown in Figs. 1 to 5 inclusive, or to supplement such valve wheel, as shown in Fig. 6.

In Figs. 1 to 5 inclusive, where applicable, the numeral 11 designates a mounting plate means adapted to replace the conventional means for applying leverage for the purpose of moving the valve stem 3. The plate may be keyed to the sleeve, held by set screw means or otherwise rigidly secured. The mounting plate 11 provides an integral, hollow, hub portion 11a centered with respect to the longitudinal and lateral dimensions of the plate, and provided for suitable engagement with the sleeve 2. A preferred form of engagement is by means of an interlocking key such as designated by the numeral 2b. A lock nut 12 threaded on the sleeve prevents movement of the mounting plate longitudinally of the sleeve. When the assembly is to be employed in conjunction with a valve stem such as common in plug valve structures, the mounting plate may preferably be provided with a center chuck hole adapted to fit the shank end of the valve stem to which it is to be applied instead of the spanner or box wrench ordinarily used.

Figure 4:
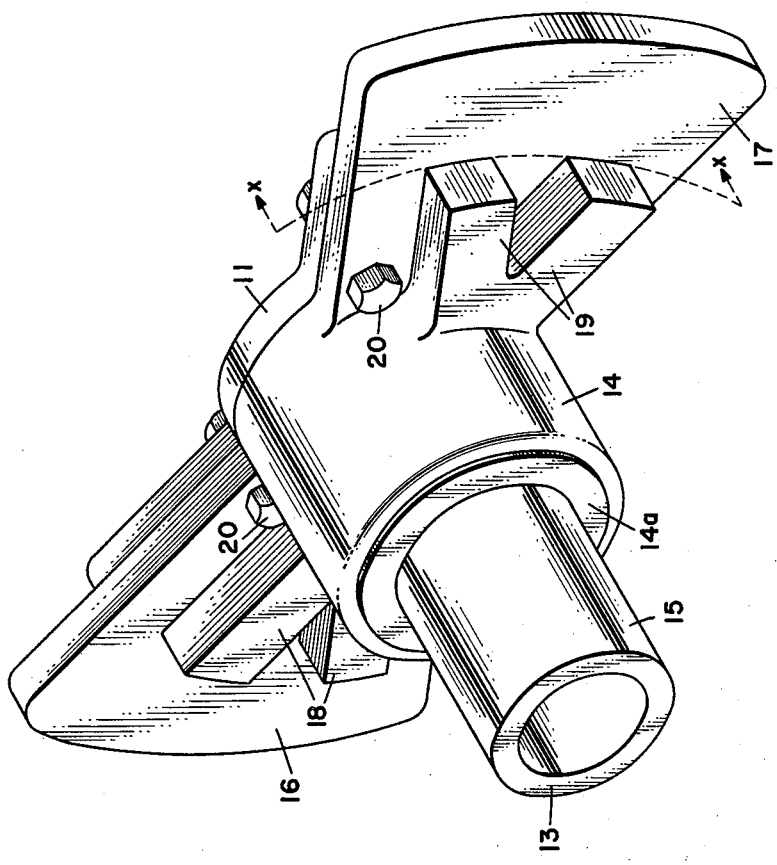
Fig. 4 is a perspective view of the anvil plate forming an element of the assembly, in association with an adapter mounting means therefor.

As more clearly shown in Fig. 4, the numeral 13 designates an anvil plate element which includes hollow, integral, hub and axle portions 14 and 15, respectively. The hub and axle together provide and define a central passageway having an enlarged end adjacent the inner or reverse surface 13a of the plate to accommodate the lock nut 12. An external shoulder 14a is formed at the juncture of the hub and axle portions. Wing portions 16 and 17 extend radially from the hub. In the plate obverse surface portion 13b are defined a pair of embossed anvil lugs 18 and 19 also extending radially outward from the hub. As shown, the lugs 18 and 19 have each a substantially V-shaped contour based on the hub 14, whereby to present flat anvil surfaces lying in planes common to the axis of the hub and perpendicular to the anvil plate surface. The V-shaped lugs also act as plate stiffening ribs. Further, these planes intersect at the anvil plate axis, whereby from lug to lug alternate surfaces lie in the same plane.

Figure 3:
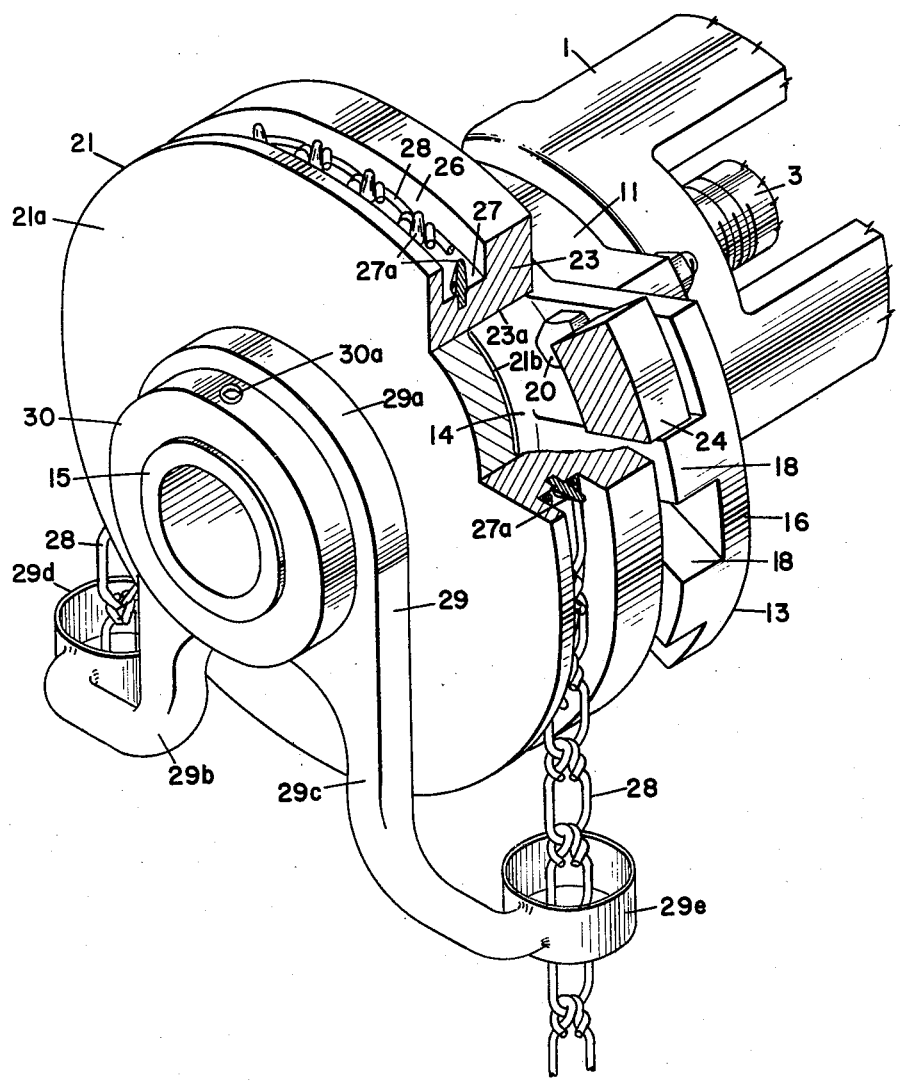
Fig. 3 is a perspective view angularly downward toward the obverse face of the assembly according to Fig. 1 and having parts broken away.

In the illustration provided by Fig. 4, as compared with Figs. 1 and 3, the wing portions 16 and 17 are shown as extended substantially beyond the outer tips of the V-shaped lugs 18 and 19. Dotted lines X—X and Y—Y, however, indicate the manner in which the extended wing portions may be omitted for the purpose of reducing the overall diameter of the assembly when employed in conjunction with the mounting plate means shown in Fig. 1. When used in the manner shown by Fig. 6, the extended wing form is employed. In both forms, the wing portions are drilled to pass bolts 20 for attaching the anvil plate 13 to the mounting plate 11, or to permit attachment of clamping means as shown in Fig. 6. Although, in the drawings the anvil plate 13 and the mounting plate 11 are shown as separate elements, the two elements may be formed as a single unit, and attached to the sleeve 2 by means of set screws in the hub portion 11a.

Next in the order of assembly elements is the striker plate, designated in the drawings by the numeral 21. This element preferably is formed of a high density metal, such as gray iron, in order to provide a relatively high weight to mass relationship, whereby to obtain a maximum application of force to the anvil plate.

The plate 21 is shown in a circular form, having a central hub 22, an annular rim 23, and obverse and reverse surface portions 21a and 21b respectively. The hub 22 is adapted to receive the anvil plate axle 15, for rotative movement thereon, with the anvil plate shoulder 14a in surface contact with the reverse surface 21b of the striker plate, at the hub thereof. The length of the axle 15 is determined so as to provide for extension thereof beyond the striker plate obverse surface portion 21a for a distance required to accommodate a retainer collar 30 and/or a chain guide 41 in concentric supported relation thereto.

The rim 23 of the striker plate 21, as shown particularly in Figs. 1 and 3, extends outwardly beyond the reverse surface portion 21b, and in perpendicular relation thereto. This extended portion is designated by the numeral 23a. As shown, it extends for a distance slightly less than the vertical distance between the outer surface of the shoulder 14a and the upper surface of the lugs 18 and 19. It provides a base for a pair of striker lugs 24 and 25 which are disposed in opposed relation diametrically of the plate 21. These lugs have a depth slightly less than the height of the anvil lugs 18 and 19. Each of the lugs 24 and 25 presents two opposite face portions at right angles to the parallel rim and reverse plate surfaces. Each such lug surface lies in a plane extending through the axis of the plate 21, and at right angles to the surfaces thereof. Further, these planes intersect at the plate axis, whereby from lug to lug alternate surfaces lie in the same plane. In addition, the angle of intersection of these planes is equal to the angle of intersection of the planes common to the anvil surfaces of the respective V-shaped anvil lugs 18 and 19, whereby the surfaces of the striker lugs may be engaged with the anvil lug surfaces in substantially total surface contact. In mounting the plate 21 on the axle 15, the striker lugs 24 and 25 are disposed so as to be intermediate the anvil lugs 18 and 19.

In addition, the rim 23 defines a recessed channel portion 26 circumferentially of the rim and plate, intermediate the obverse and reverse surface portions thereof. The channel 26 has a bottom wall 27 on which are formed a plurality of upstanding radial studs 27a. The studs extend outwardly from the bottom wall, and are uniformly spaced from one another peripherally thereof. It is contemplated that the channel and studs will be integrally formed in the striker plate rim, in a casting operation. Alternately, however, the studs may be omitted in the casting operation, and be provided by insertion of separately formed stud pins threaded or forced into receiving recesses drilled in the bottom wall 27.

In effect, the channel and studs cooperate to provide a recessed sprocket structure, adapted to receive an endless sprocket chain such as indicated by the numeral 28. By means of the chain, the plate may be rotated in either a clockwise or counterclockwise direction, whereby to engage the striker and anvil lugs.

The numeral 29 designates a chain guide, and the numeral 30 an assembly retainer collar. The chain guide includes a hub 29a, adapted to be received on the hub 22 of the striker plate 21 adjacent the striker plate obverse surface portion 21a, and a pair of arms 29c and 29b extending from the hub in substantially tangential relation thereto. All are more particularly shown in Fig. 3. Each arm terminates in an annular eye, 29c and 29d respectively. By suitable inclination of the arm ends, these eyes are disposed in axially parallel relation to each other, and so that with the guide in its mounted position, the respective axes are in substantially tangential relation to the bottom wall 27 of the striker plate rim channel 26. In the assembly as shown, the collar 30 is held in fixed relation to the axle 15, as by means of dog-toothed set screws such as indicated by the numeral 30a in Fig. 1.

Figure 2:
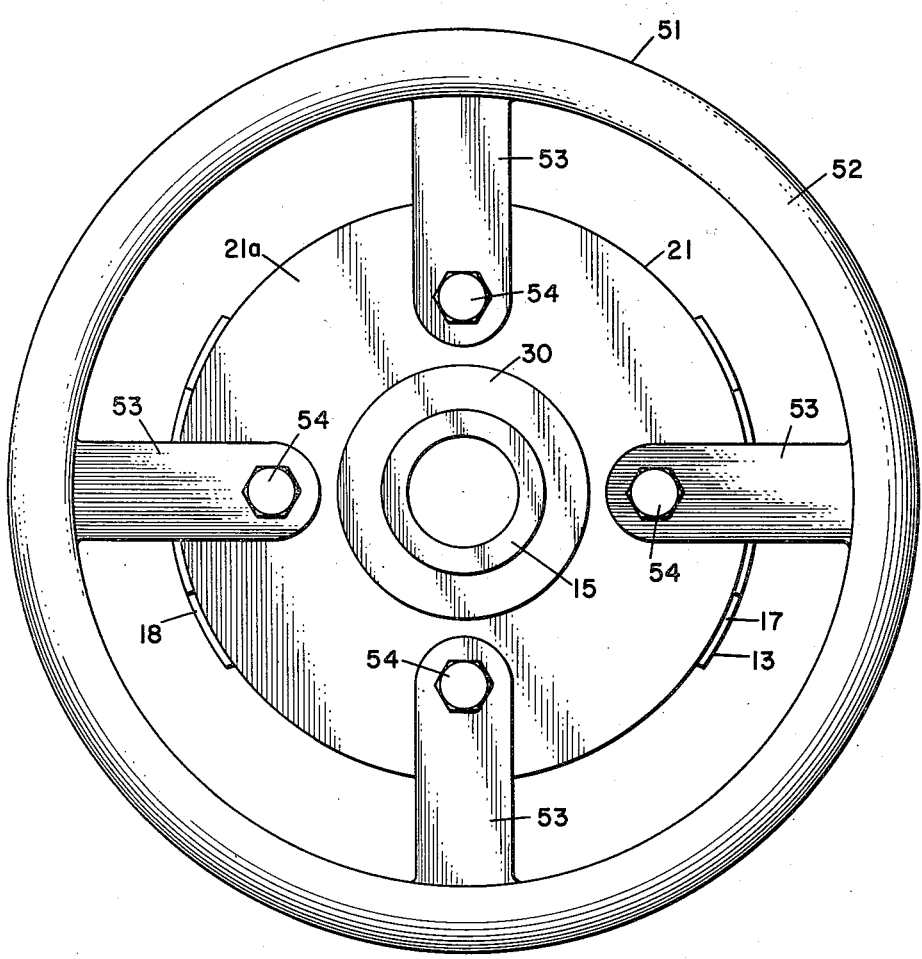
Fig. 2 is an end view taken along the line II—II of Fig. 1 of a modified form of the assembly.

In the modified device according to Fig. 2, the chain 28 and chain guide 29 have been omitted. In this form, the striker plate is actuated by means of a handwheel attachment 51. The hand wheel has a rim 52 and a plurality of radial spoke elements 53. These spokes extend inwardly from the rim equally toward the axis thereof, but terminate in a circular line having a radius slightly greater than the radius of the striker plate hub 22. The rim 52 has a radius substantially greater than that of the striker plate 21. The rim is mounted on the obverse surface of the striker plate by means such as stud bolts 54 extended through bolt holes at the inner ends of spokes 53 into threaded engagement in suitable recesses provided in the obverse surface 21a of the striker plate 21.

Figure 5:
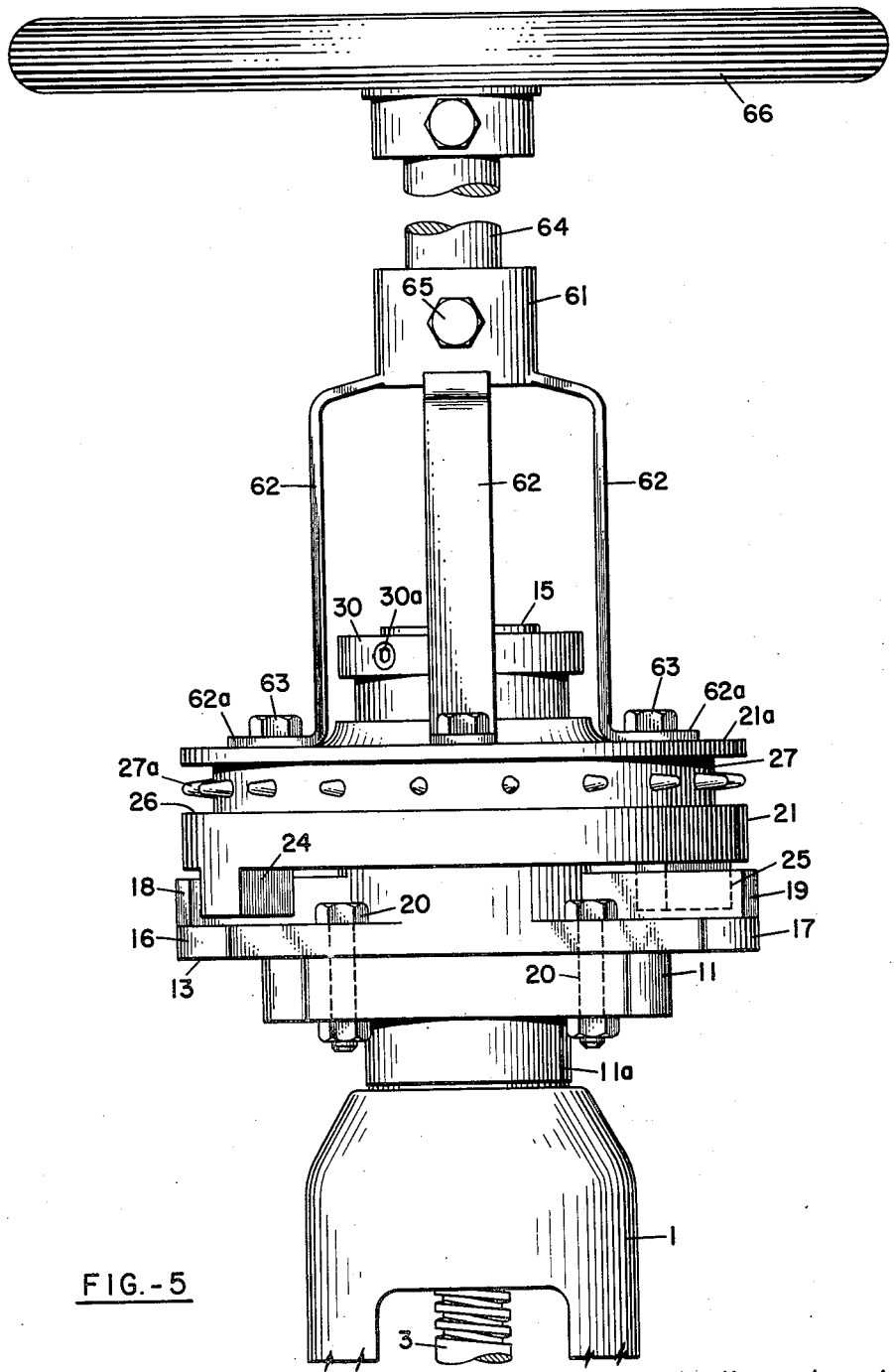
Fig. 5 is a view in side elevation of the assembly substantially as shown in Fig. 1, but illustrating extension actuating means therefor.
Figure 6:
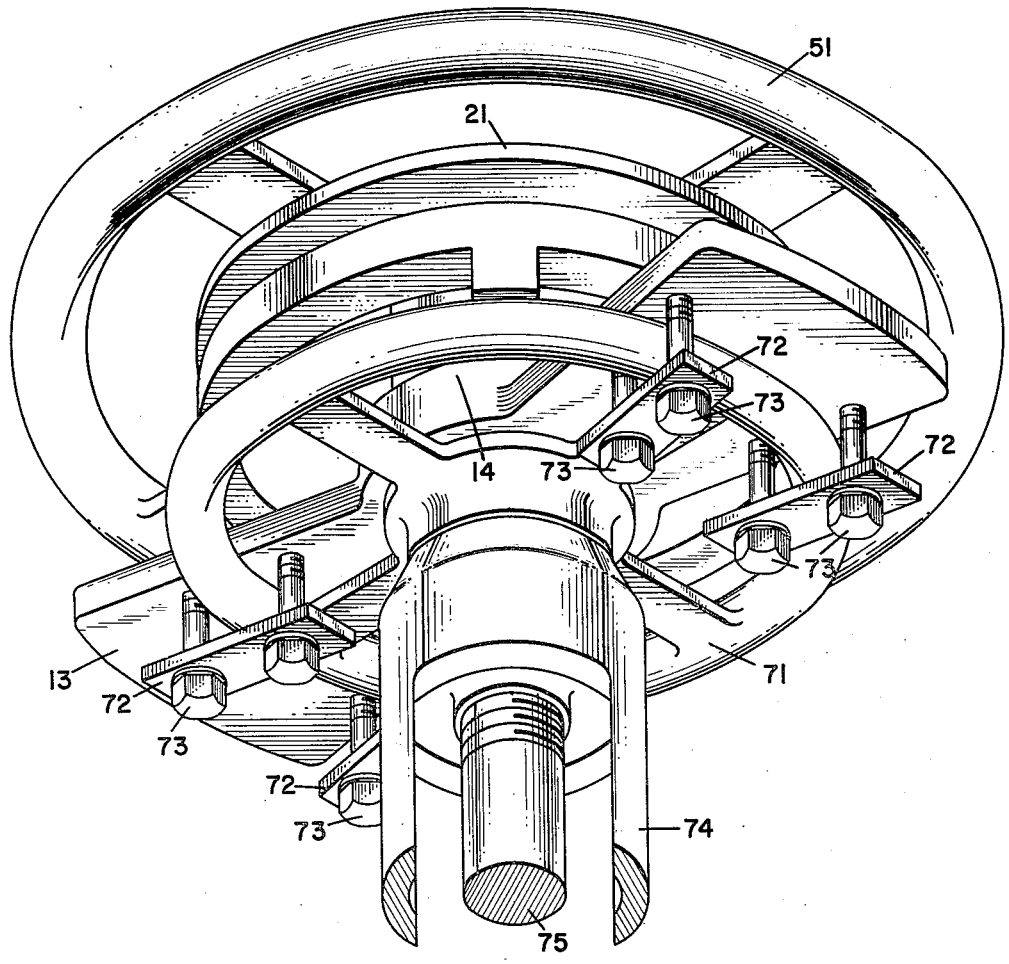
Fig. 6 is a perspective view taken from the reverse side of an assembly, illustrating the manner of adaptation to a conventional valve wheel and valve structure, and showing a portion of the valve bonnet support and valve stem.

Fig. 5 illustrates a manner in which the operating assembly may be provided for actuation at some distance from its location. As shown, the hand wheel 51 is replaced by a spider unit, including a hub 61, and a plurality of spokes or arms 62. The arms 62 provide outer ends 62a shaped to lie flat against the obverse surface 21a of the striker plate 21. The intermediate portion of each arm 62 extends outwardly from the plate, while the inner end of each arm is angled inwardly to a juncture with the hub 61. The conformation of the arms is designed to center the hub 61 in coaxial relation with the axle 15 when the spider arms are secured as by means of the stud bolts 63.

The hub 61 is adapted to receive and retain one end of an extension shaft 64 in rigidly fixed relation. The shaft 64 may be keyed to the hub and held as by a set screw stud 65. The opposite end of the extension shaft is provided to receive an actuating means such as the wheel 66 or any other actuating means. Although not shown, the shaft 64 need not be continuous, but may include gear or universal joint connections introduced intermediate its length in any conventionally accepted or suitable fashion.

The operating assembly, as illustrated by Fig. 6, omits the mounting plate 11 of Fig. 1. As shown in Fig. 6, the assembly includes the anvil plate, as shown in full lines in Fig. 4, and the striker plate 21 and the hand wheel 51 combination of Fig. 2. This assembly is mounted on and engaged with the handwheel 71 of a typical "rising wheel" valve unit. Engagement is accomplished by means of a series of four clamping bars 72. The reverse surface of the anvil plate is applied to the outer face of the valve wheel, as shown, and the clamping bars are attached to the anvil plate reverse surface, by means of stud bolts 73, so as rigidly to engage the hand wheel rim between bars and anvil plate. In the drawing, the numerals 74 and 75 designate a portion of a valve bonnet support and the valve stem, respectively, the valve stem being threaded through a fixed passageway in the bonnet support, and the hand wheel being fixed to the outer end of the stem.

In operation, the striker plate is rotated, by whatever actuating means provided, to carry the striker lugs through an arc limited by the respective anvil lug surfaces. The kinetic energy of the rotated striker plate is delivered against the anvil lugs by means of the striker lugs upon impact. A sufficient impact force may be thus applied to turn the valve stem and firmly seat the valve thereon against considerable resistance. Likewise, the same force may be applied to quickly unseat a stuck or tight valve.

What is claimed is:

1. A valve operating assembly comprising in combination, an anvil plate having obverse and reverse surface portions, a hollow axle on said obverse surface portion extending outwardly therefrom in perpendicular relation thereto, a pair of anvil lugs embossed on said obverse surface portion and disposed thereon in opposed relation diametrically of said anvil plate axle, a striker plate unit, having obverse and reverse surface portions, a pair of striker studs embossed on said striker plate reverse surface portion and disposed thereon in opposed relation diametrically of said striker plate, a hub defined in said striker plate opening through said plate obverse and reverse surface portions, said hub adapted to receive said anvil plate axle for rotation thereon whereby to engage said striker studs with said anvil studs in either a clockwise or a counter-clockwise direction, means for rotating said striker plate, means for mounting said assembly in operative relation with the valve stem of a valve, and means to retain said striker plate against movement longitudinally of said anvil plate axle.

2. A valve operating assembly according to claim 1 wherein said means for rotating said striker plate comprises a hand wheel having a rim and a series of spoke elements extending radially inward from said rim in opposed pairs, said spokes terminating in equally spaced relation to the center point of said rim, and each being adapted for fixed engagement with the obverse surface of said striker plate.

3. A valve operating assembly according to claim 1, wherein said means for rotating said striker plate comprises a rim portion on said striker plate, a circumferential channel defined in said rim to open radially therefrom, said channel having a bottom wall, a series of studs, extended radially outward from the bottom wall of said channel, in uniform circumferentially spaced relation one to another, said channel and studs being respectively adapted to receive and to engage the links of a bight of an endless link chain laid therein, and a chain guide freely supported from said anvil plate axle to receive the respective dependent portions of said chain bight, and to align said portions with said channel.

4. A valve assembly according to claim 3, wherein said chain guide comprises an annular hub adapted to be received on said anvil plate axle in freely fitted rotative relation, intermediate said striker plate obverse surface portion and said striker plate retainer means, a pair of arcuately spaced guide arms extended radially from said hub, each of said arms terminating in a chain receiving guide ring having an axis lying substantially in a plane common to the center line of said rim defined, circumferential channel.

5. A valve operating assembly according to claim 1, wherein said means for mounting said assembly in operating relation with the valve stem of a valve, comprises a valve wheel engaged with said stem, said wheel having a rim, and clamping means mounted on said anvil plate reverse surface portion to engage said valve wheel rim in fixed relation to said anvil plate reverse surface portion.

6. A valve operating assembly according to claim 5, wherein said valve wheel is engaged in fixed relation with said stem, and said stem is adapted for threaded engagement in a valve bonnet support therefor.

7. A valve operating assembly according to claim 5, wherein said valve wheel is engaged in threaded concentric relation to said valve stem, and is rotatably mounted on a valve bonnet supporting retainer therefor, said stem being reciprocally movable through said valve wheel by rotation thereof.

8. A valve operating assembly according to claim 1, wherein said means for mounting said assembly in operating relation with said valve stem, comprises a substantially flat mounting plate having a hub portion defined therein equidistant from the opposite ends of said plate and midway of the sides thereof, said hub being adapted for fixed engagement with said stem, and said stem is adapted for threaded engagement in a valve bonnet support therefor, said mounting plate having an obverse surface portion adapted to receive said anvil plate reverse surface portion in fixed surface to surface engagement.

9. A valve operating assembly according to claim 1, wherein said means for mounting said assembly in operating relation with said valve stem comprises a substantially flat mounting plate having a hub portion defined therein equidistant from the opposite ends of said plate and midway of the sides thereof, said hub being adapted for threaded coaxial engagement with said stem, and a sleeve, affixed to said plate in coaxial relation to said hub, said sleeve being secured for rotative non-linear motion by said valve body.

References Cited in the file of this patent

UNITED STATES PATENTS

| | | |
|---|---|---|
| 1,831,187 | Mohr | Nov. 10, 1931 |
| 1,990,197 | Mohr | Feb. 5, 1935 |
| 2,452,428 | Bryant | Oct. 26, 1948 |